July 11, 1967
R. S. FREEMAN
3,330,987
METHOD OF AND APPARATUS FOR PRODUCING HIGH
INTENSITY RADIATION BY AN ARC
Filed Nov. 22, 1963
8 Sheets-Sheet 1
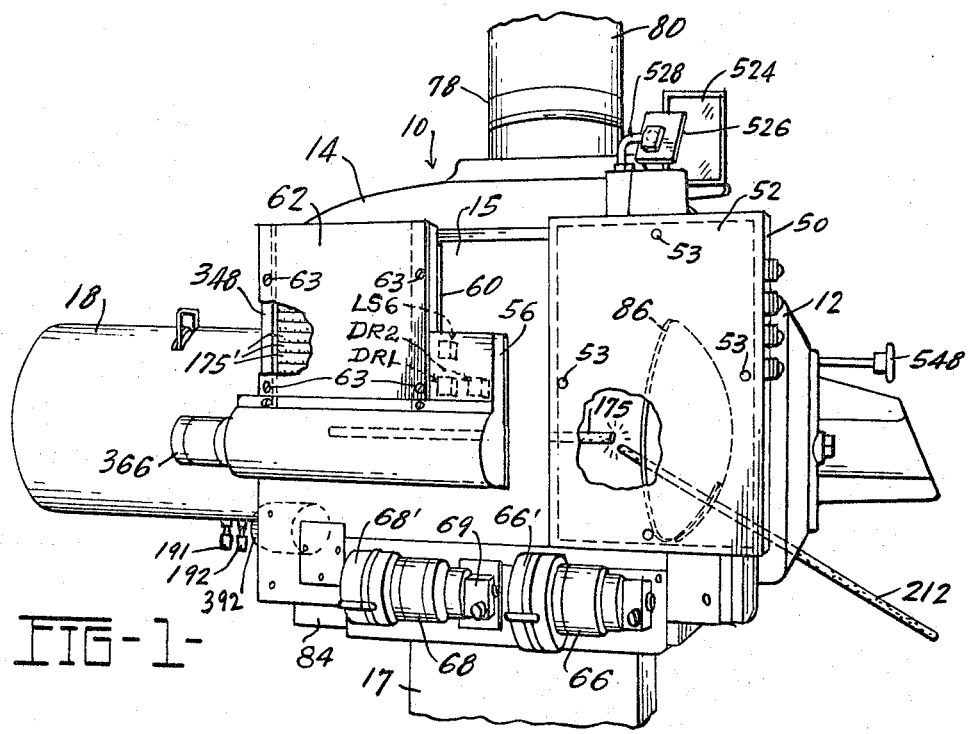
FIG-1-
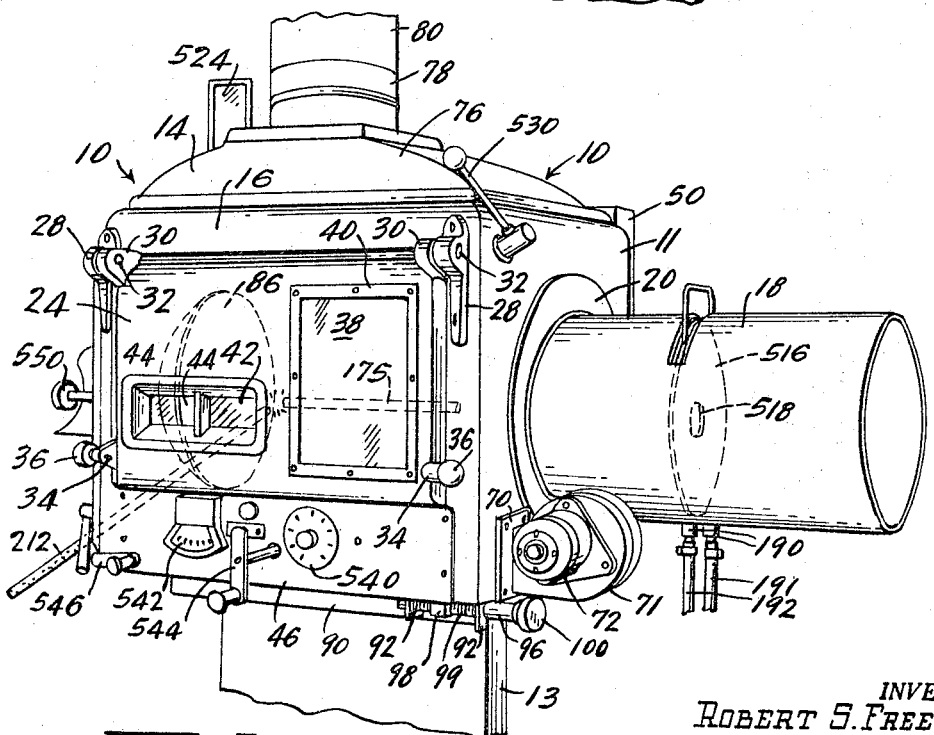
FIG-2-
INVENTOR:
ROBERT S. FREEMAN.
BY
Harry O. Ernsberger
ATT'Y.

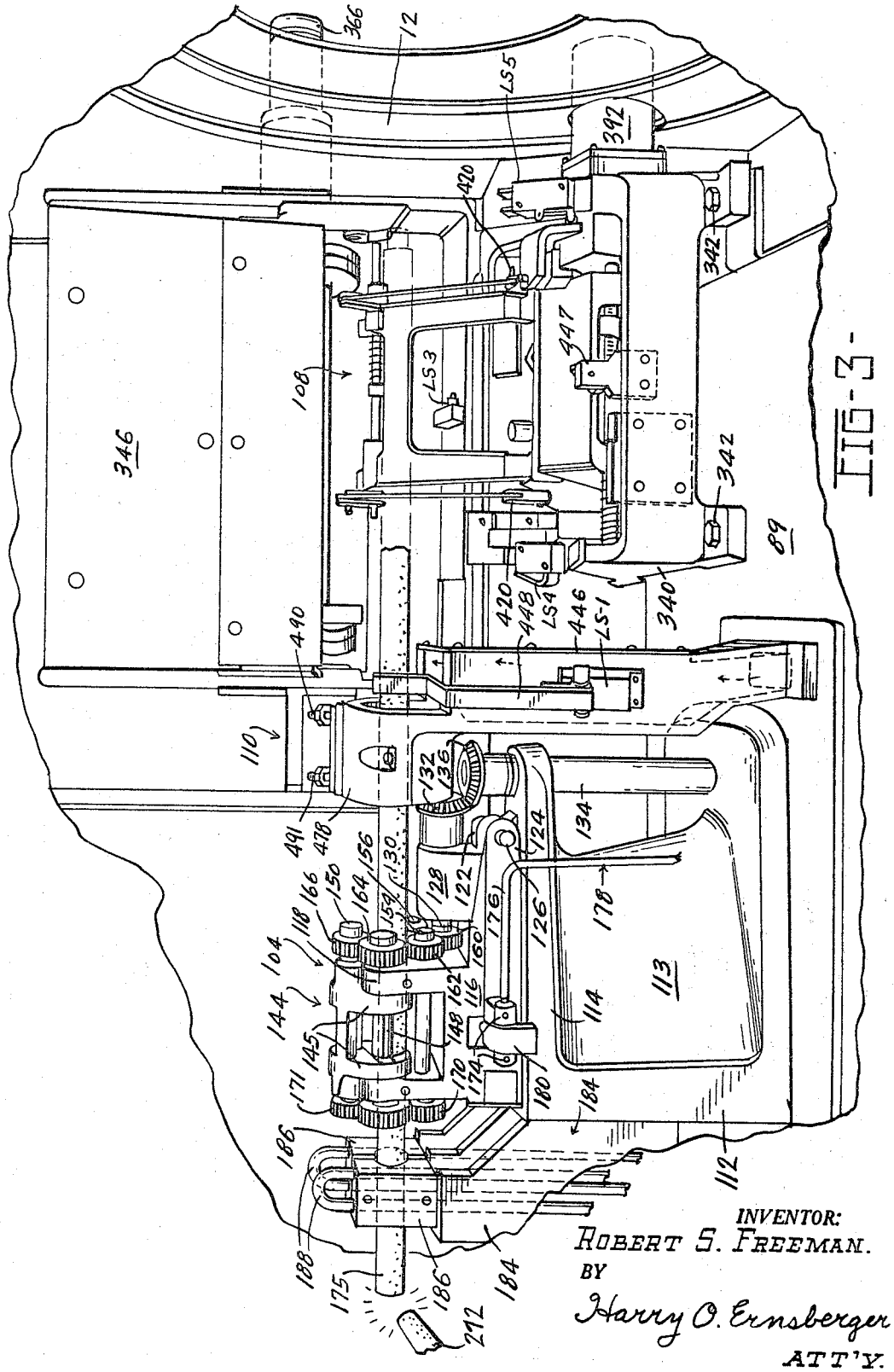

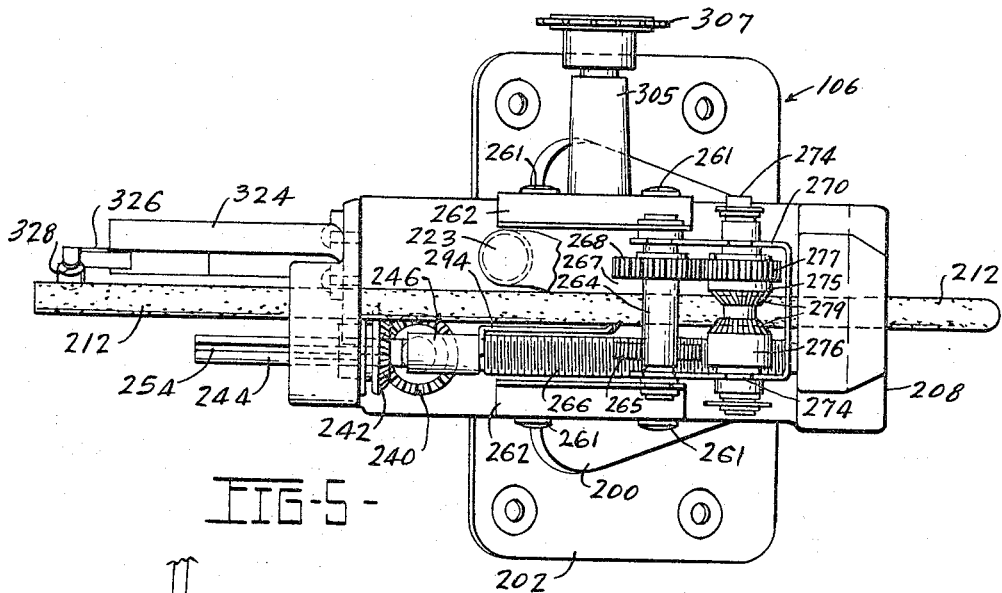
FIG-5-
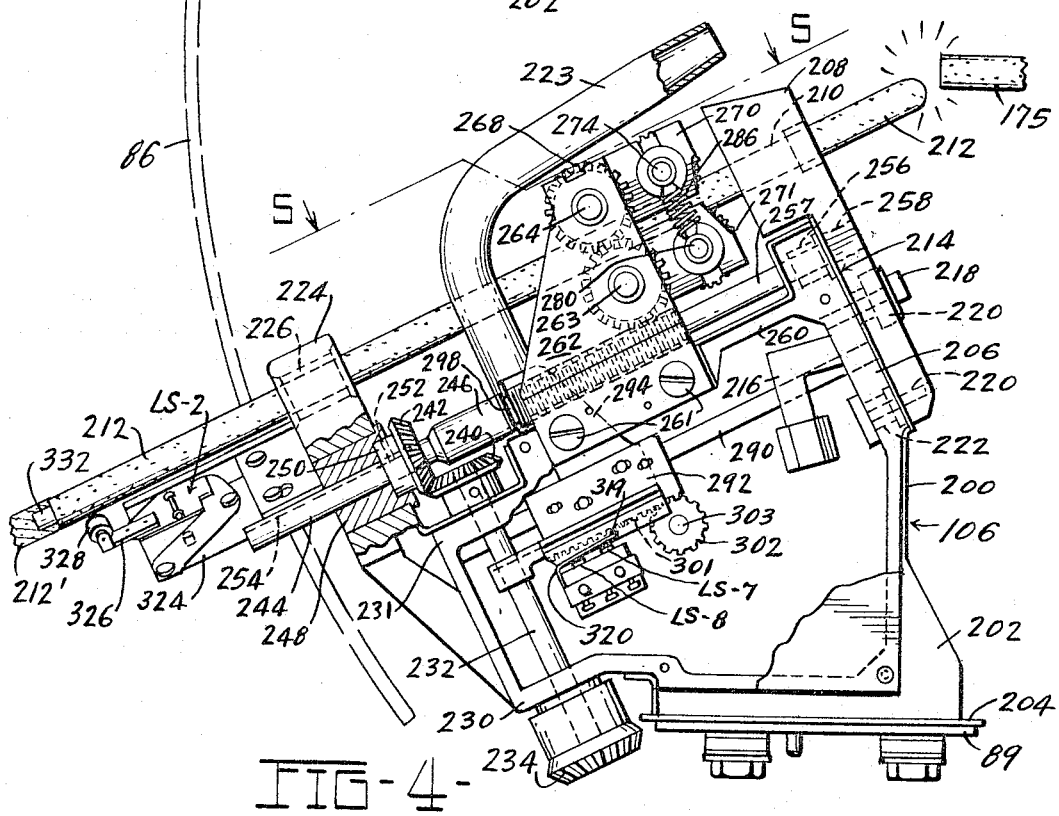
FIG-4-

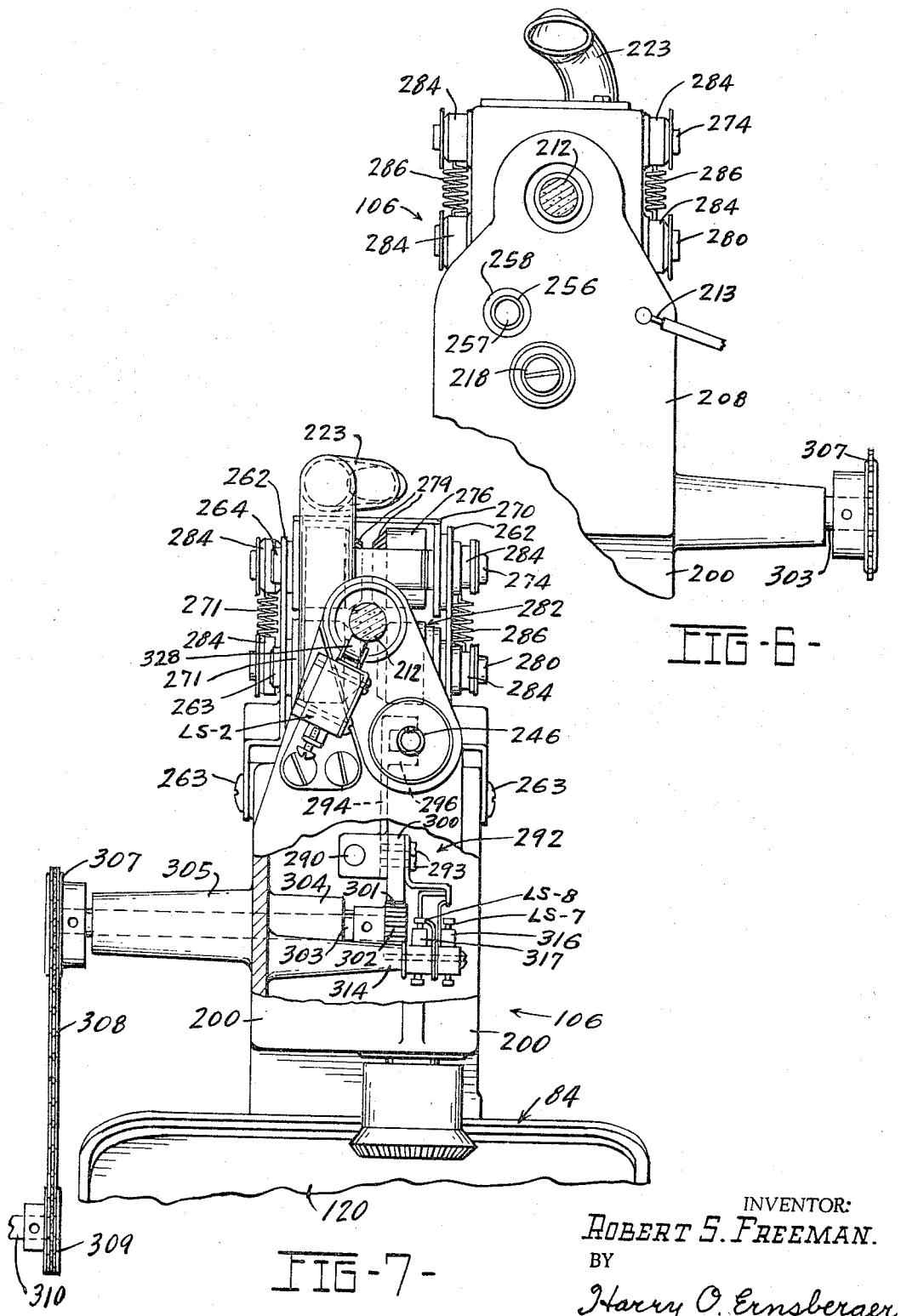

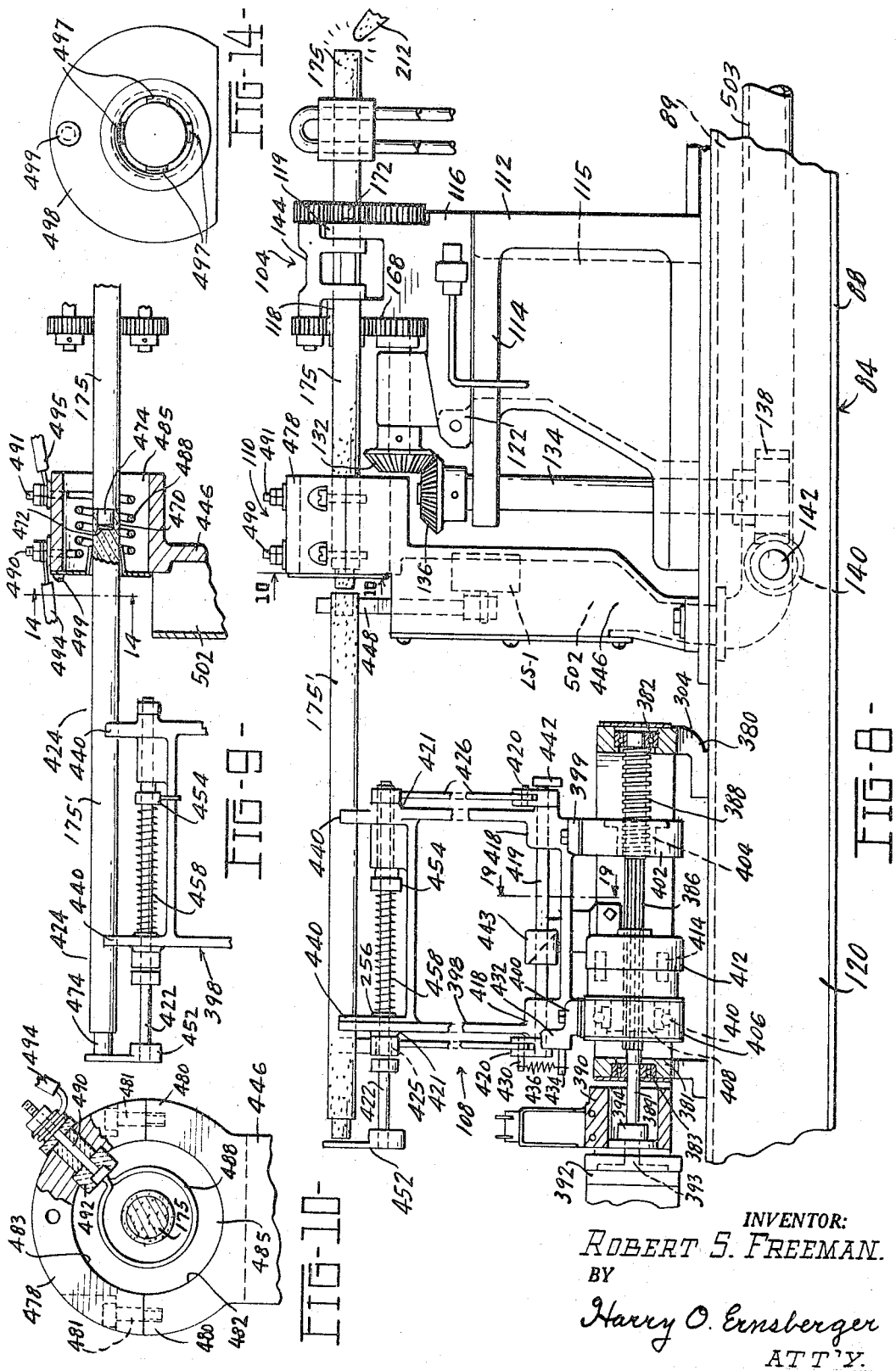

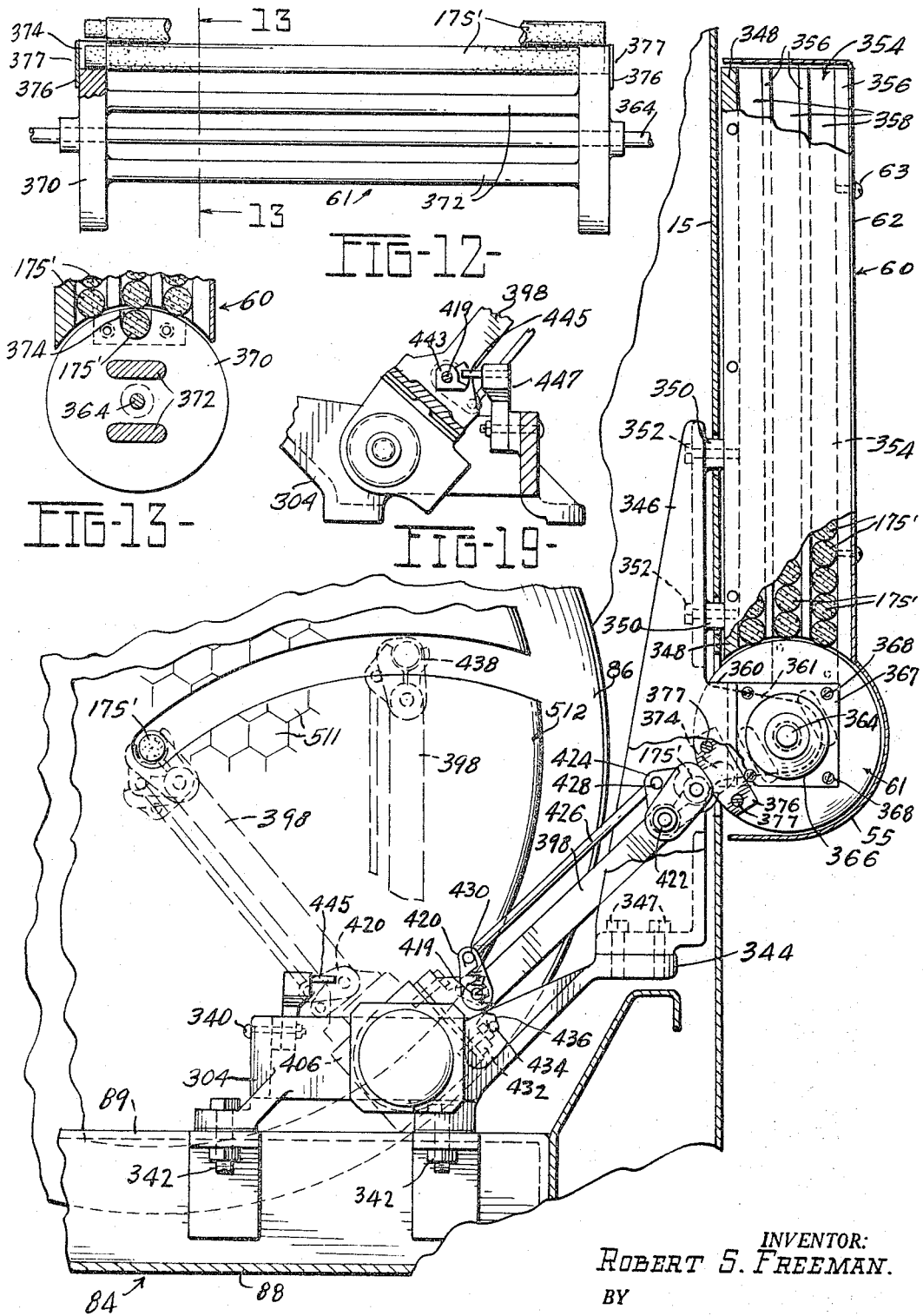

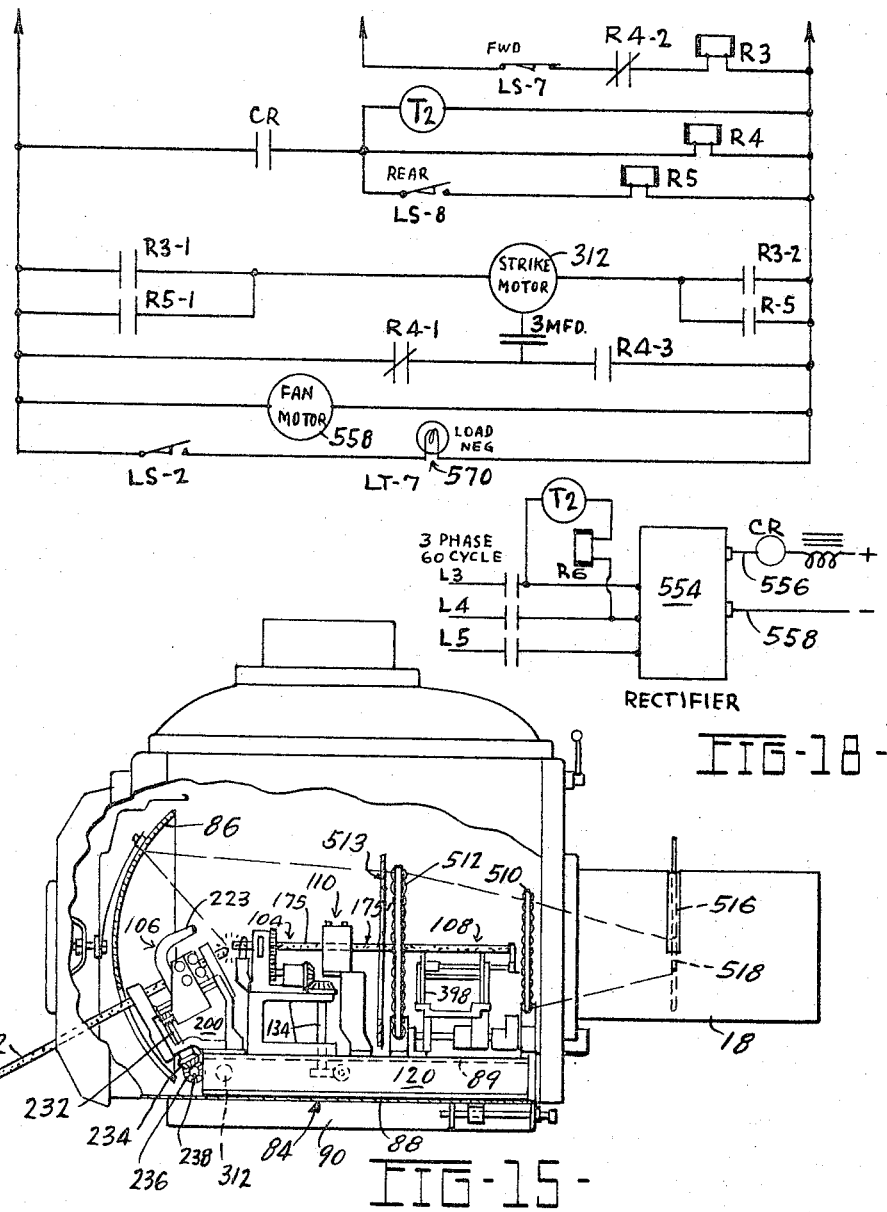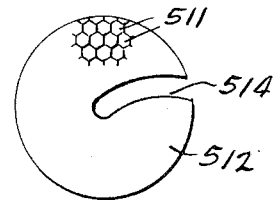

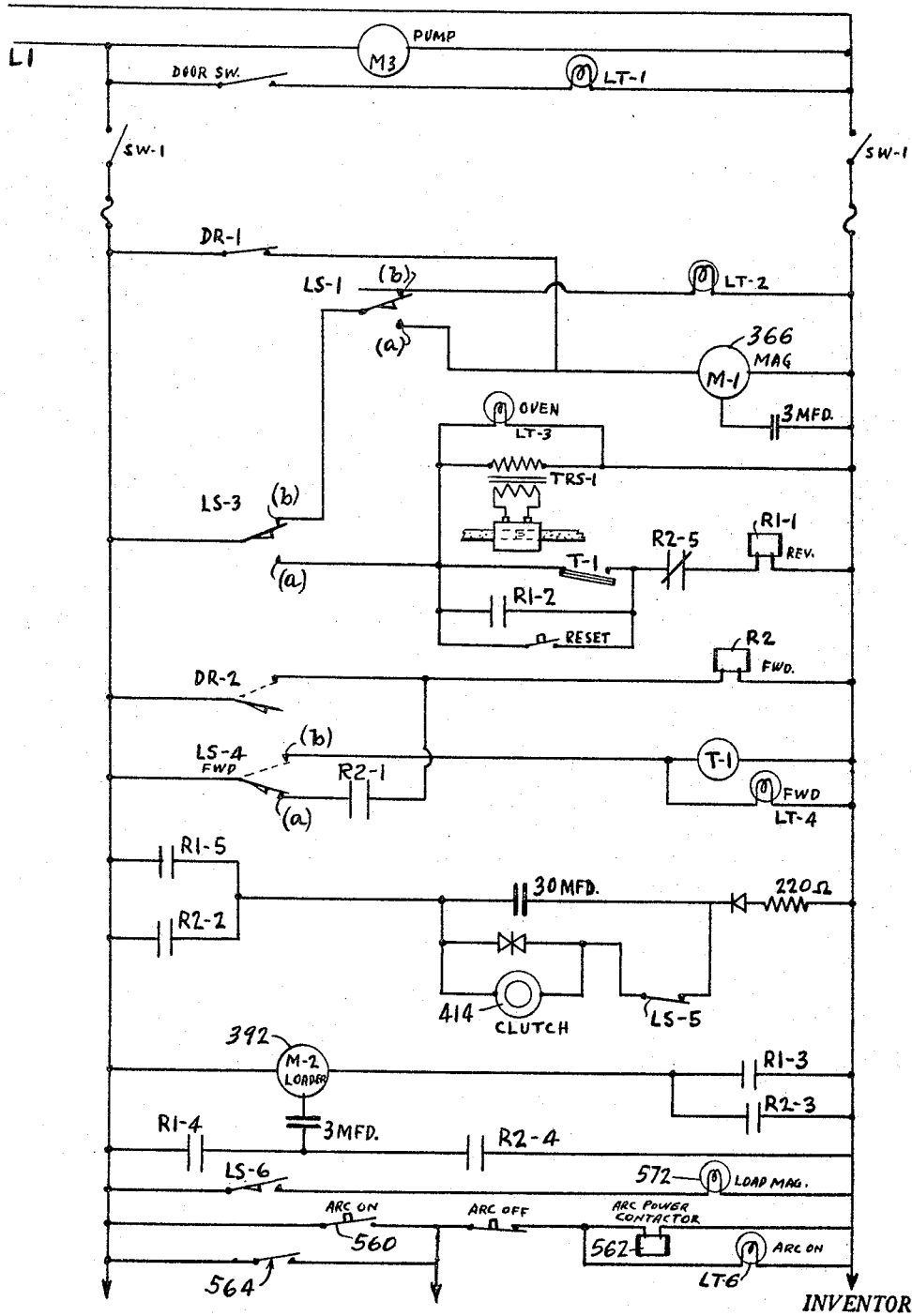
FIG-17-

United States Patent Office 3,330,987
Patented July 11, 1967

3,330,987
METHOD OF AND APPARATUS FOR PRODUCING HIGH INTENSITY RADIATION BY AN ARC
Robert S. Freeman, Toledo, Ohio, assignor to The Strong Electric Corporation, Toledo, Ohio, a corporation of Delaware
Filed Nov. 22, 1963, Ser. No. 325,677
16 Claims. (Cl. 314—5)

This invention relates to a method of and apparatus for producing high intensity radiation by an arc and more especially to a high intensity arc and lens system adapted for simulating solar radiation.

Arc lamps have heretofore been developed and used particularly for motion picture and theater use and in the graphic arts field where high intensity illumination is desired. Arc lamps have been used to provide radiant energy from an arc established between positive and negative electrodes of finite lengths and, in some instances negative electrodes of the disc type have been employed. The burning life of positive electrodes or carbons is relatively short, heretofore necessitating frequent replacement of the positive electrodes. Such arrangements necessitated periodic interruptions to replace the positive electrode which precluded continuous operation over long periods of time.

The present invention embraces a method of establishing and continuously maintaining an arc between positive and negative electrodes providing continuous high intensity radiation without interruption over long periods of time.

An object of the invention is the provision of a method of controlling and maintaining a substantially continuous arc in combination with a lens system whereby the radiant energy simulates solar radiation.

Another object of the invention is the provision of a method of operating an arc lamp to promote continuous operation of the arc over long periods of time with a high degree of stability of the radiant energy produced.

Another object of the invention resides in an apparatus for automatically establishing and maintaining a high intensity arc for continuous operation.

Another object of the invention resides in an arc lamp or apparatus for continuously maintaining an arc between positive and negative electrodes wherein automatically operable means is effective to successively feed positive electrode sections into arc forming position as the positive electrodes are consumed through continuous operation.

Another object of the invention resides in the provision of an arc lamp embodying automatically operable means for successively transferring electrode sections from a supply into operative or arc forming position to maintain a continuous arc of stable character without interruption during the electrode transferring operation.

Another object of the invention resides in a method of joining an electrode section with a partially consumed electrode section which is reliable in operation and which provides for continuous feed to the arc of succeeding sections enabling the uninterrupted use of the arc for long periods of time.

Another object of the invention resides in an automatic electrode transfer means functioning in association with a magazine containing a plurality of electrode sections for effecting positive transfer of successive electrode sections to the positive head of an arc lamp, which transfer mechanism is brought into operation before the positive electrode forming the arc is entirely consumed.

Another object of the invention resides in successively joining positive electrode sections by a comparatively low temperature softening medium in conjunction with means for cooling the electrode section to prevent premature softening or fusing of the medium for joining electrode sections.

Another object of the invention resides in a high intensity arc system in combination with a lenticular lens system for solar simulation to promote efficient utilization of the radiant energy from the arc.

Another object of the invention is the provision of a high intensity arc system in combination with a lenticular lens system to secure uniform intensity of radiant energy from the arc directed to a predetermined concentrated area and wherein the intensity may be varied without affecting uniform distribution of the energy.

Another object of the invention resides in a method of and apparatus for efficiently collecting radiant energy from a high intensity arc by a reflector surface and projecting the collected radiant energy through a dual lenticular lens system to effect concentration of the radiant energy into a reimaged area of a defined shape such as an area of hexagonal contour and maintaining a high degree of energy stability and uniform distribution.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

FIGURE 1 is a perspective view of one side of the arc lamp construction for carrying out the method of the invention;

FIGURE 2 is a perspective view of the opposite side of the arc lamp construction;

FIGURE 3 is an enlarged perspective view of the means supporting and feeding the positive electrode and the electrode section transfer mechanism forming part of the invention;

FIGURE 4 is an enlarged side elevational view of the negative electrode support and feed means, certain portions being shown in section;

FIGURE 5 is a top plan view of the construction shown in FIGURE 4, the view being taken substantially on the line 5—5 of FIGURE 4;

FIGURE 6 is a front elevational view of the negative electrode support and feed mechanism;

FIGURE 7 is a rear view of the construction shown in FIGURE 4, certain portions being broken away for purposes of illustration;

FIGURE 8 is an elevational view of the supporting head for the positive electrode and the electrode section transfer means;

FIGURE 9 is a fragmentary view illustrating the method and means of joining adjacent positive electrode sections;

FIGURE 10 is an enlarged detail sectional view showing the oven means for fusing electrode section joining medium;

FIGURE 11 is a transverse sectional view of the electrode section transfer means and the electrode supply magazine;

FIGURE 12 is an elevational view of a component of the electrode section transfer means;

FIGURE 13 is a sectional view taken substantially on the line 13—13 of FIGURE 12;

FIGURE 14 is a detail view taken on the line 14—14 of FIGURE 9;

FIGURE 15 is a semi-diagrammatic lengthwise view of the lamp illustrating the reflector and lenticular lens system;

FIGURE 16 is a plan view of one of the lenses of the lens system;

FIGURE 17 is a circuit diagram of a portion of the control circuit and control components;

FIGURE 18 is a circuit diagram showing the remainder of the control circuits and control components, and FIGURE 19 is a detail sectional view taken substantially on the line 19—19 of FIGURE 8.

While the embodiment of the invention illustrated herein is particularly usable as a high intensity arc lamp and lens system for simulating solar radiation, it is to be understood that the novel features of the invention may be embodied in arc lamps for various other uses.

Referring to the drawings in detail and initially to FIGURES 1 and 2, the arc lamp construction embodying the invention is of a type utilizing electrodes or carbons of the rod type which are automatically advanced to maintain an arc formed between adjacent tips of the electrodes at a focal point of a main reflector, the arrangement including automatic means for maintaining an arc of substantially constant intensity and at the focal point of the reflector. The arrangement includes a lenticular lens system, shown in FIGURE 15, for controlling the radiant energy from the arc as hereinafter described.

The lamp structure includes a substantially rectangular housing 10 having a front cover member or panel 11, a rear cover member 12, a roof or top cover 14, and side panels 15 and 16, these components being formed of sheet metal secured to a skeleton frame (not shown). The lamp structure may be supported upon a pedestal 17. The forward portion of the lamp includes a cylindrically-shaped casing 18 carried by an annular member 20 secured to the front cover 11.

As shown in FIGURE 2, the side panel 16 of the housing 10 is provided with a rectangularly-shaped opening which is normally closed by means of a hinged cover 24. As illustrated in FIGURE 2, there is secured to the side panel 16 a pair of brackets 28. The cover 24 is provided with projecting lugs 30 disposed respectively adjacent the brackets 28. The brackets 28 and lugs 30 are provided with aligned openings to accommodate hinge pins 32 providing a hinge support for the cover 24.

The lower corner regions of the cover 24 are provided with projecting lugs 34 to which are secured knobs or members 36 providing readily accessible means to enable the operator to swing the cover 24 to an open position to facilitate access to the components interiorly of the housing 10. The hinged cover 24 is provided with a rectangular window opening covered or masked by a glass panel 38 of a composition to provide a light mask or shield to enable an operator to visually inspect the operation of the interior components without opening the cover 24.

The masking glass is secured in place by a rectangular frame 40 secured to the cover 24. The cover 24 is also provided with additional inspection windows 42 and 44 which are covered by a glass mask of the same character as the mask 38. Also secured to the region 46 of the side panel 16 of the housing are instruments and control means to be hereinafter described.

FIGURE 1 illustrates the opposite side of the lamp housing. Secured to the side panel 15 of the housing is a rectangularly-shaped cabinet 50 provided with a removable cover 52 secured in place by means of screws 53. The cabinet 50 encloses and supports control components and wiring junction blocks. Disposed adjacent the side panel 15 is a sheet metal housing 56 which encloses a rotatable component of the electrode transfer mechanism of the invention.

Also disposed adjacent the side panel 15 is a rectangularly-shaped portion 60 which provides a magazine containing a supply of positive electrode sections, the magazine 60 being equipped with a cover or closure plate 62 which is removably secured in place by means of screws 63. The housing 56 and magazine 60 are supported independently of the side panel 15 for a purpose hereinafter described.

Mounted upon the lower part of a base construction 84 is a motor 66 and a motor 68, the purposes of which will be hereinafter described. Secured to the front panel 11 of the housing is a bracket 70 supporting a blower housing 71 containing a revoluble blower driven by a motor 72, the purpose of the blower being hereinafter described. The roof 14 of the housing is provided with a comparatively large vent pipe 78 adapted to be connected by a tube 80 with an exhaust blower (not shown) of comparatively large capacity in order to rapidly remove heat from the interior of the lamp housing.

A feature of the invention resides in a method and means for successively joining and feeding positive electrode sections as a positive electrode is consumed. The positive electrode sections utilized in the lamp construction burn away or are consumed at a rate many times the burning or consumption rate of the negative electrode, for example, the ratio of the burning rates may be approximately eleven to one.

The positive head for supporting and feeding the positive electrode sections, the arrangement for supporting and feeding the negative electrode, the transfer mechanism for transferring positive electrode sections from the magazine 60 and the magazine are supported upon the base construction 84 which is arranged for lengthwise movement or adjustment relative to the housing 10 and the reflector 86 in order to adjust these components so as to establish the arc at the focal point of the reflector 86.

The base 84 is of hollow configuration having a lower plate 88 and an upper plate 89 spaced therefrom as shown in FIGURE 15 to provide a chamber 120. The base construction 84 is supported upon lengthwise arranged tracks or ways 90 mounted at the lower edge regions of the side panels 11 and 15 of the housing forming parts of the skeleton frame supporting the housing panels, the base 84 being movable lengthwise along the tracks 90.

Referring to FIGURE 2, a pair of spaced lugs 92 are secured to and extend from one of the ways 90, the lugs having openings therein to accommodate an adjusting member 96. Secured to the relatively movable base construction 84 is a lug or member 98 having a threaded bushing which accommodates a threaded portion 99 of the member 96, the member 96 being provided with a manipulating knob 100. By rotating the knob 100 and member 96, the base construction 84 and the components carried thereby illustrated in FIGURE 15, may be readily adjusted to establish the proper relation between the arc and the reflector 86.

Mounted upon the upper plate 89 of the base construction 84, as shown in FIGURE 15, is a positive electrode supporting and driving heading or unit 104, a negative electrode supporting and driving head or unit 106, an electrode transfer unit 108 for moving positive electrode sections into successive operative positions, and an oven or fusing unit 110 for joining positive electrode sections together as positive electrode sections are consumed.

The magazine 60 containing a supply of positive electrode sections and a rotatable drum or carrier 61 contained within the housing portion 55 are mounted upon the base construction 84 and are movable therewith.

The unit or construction 104 for supporting and feeding a positive electrode to form an arc is illustrated in FIGURES 3 and 8. Mounted upon and secured to the upper plate 89 of the base construction 84 is a pedestal or support member 112 provided with a horizontal portion 114. Mounted upon the horizontal portion 114 of pedestal 112 is a member or head 116 which is fashioned with spaced upwardly extending boss portions 118 and 119. The horizontal portion 114 of the pedestal is provided with a boss portion 122.

The member or head 116 is provided with furcations 124 which straddle the boss 122. The boss 122 and the furcations 124 are provided with aligned openings to receive a pin 126 for pivotally securing the member 116 to the support pedestal 112. The member 116 is provided with a boss 128 which is bored to form a journal bearing for a shaft 130. Fixedly secured on the shaft 130 adjacent one end of the boss 128 is a bevel gear 132.

Journally supported in openings formed in the horizontal portion 114 of the support 112 and in the base portion of the support is a vertically disposed drive shaft 134.

Fixedly secured to a portion of the shaft 134 extending above the horizontal portion 114 is a bevel gear 136 which is in mesh with the bevel gear 132. As particularly shown in FIGURE 8, the vertical drive shaft 134 extends into the chamber defined by the upper and lower base plate members 88 and 89 and is equipped at its lower end with a worm gear 138.

The gear 138 is in mesh with a worm 140 fixedly mounted on a transversely extending shaft 142 driven by the motor 68, the latter being shown in FIGURE 1. The shaft 142 is driven at a comparatively slow speed through speed reducing gearing of conventional construction contained within a housing 69 secured to the housing of the motor 68 as shown in FIGURE 1. Disposed between the upwardly extending boss portions 118 and 119 of the head 116 is a bracket or member 144 fashioned with boss portions 145 which extend between the bosses 118 and 119.

The bosses 145 and the bosses 118 are formed with aligned openings to accommodate a shaft 148 whereby the bracket or member 144 is pivotally supported upon the member 116 for movement about the axis of the shaft 148. The boss portions 145 of the bracket 144 are provided with aligned openings forming a journal support for a shaft 150. The member 116 is provided with aligned openings which form journal supports for a shaft 154.

The boss portions 118 and 119 are also provided with openings to accommodate a shaft 156. Fixedly mounted upon the shaft 130 is a spur gear 160 which is driven by the bevel gear 132 through the shaft 130. The gear 160 is in mesh with a gear 162 mounted on shaft 154, the gear 162 being in mesh with a gear 164 mounted on the shaft 148, the latter being in mesh with a gear 166 mounted on the shaft 150. A gear 168 is mounted on the shaft 156.

Mounted upon shafts 154, 150 and 156 are electrode drive rolls or feed rolls 170, 171 and 172 which engage a positive electrode section 175 for advancing the same. The electrode-engaging rolls are provided with knurled peripheral surfaces engageable with the surface of the positive electrode and the axes of the rollers and their supporting shafts are angularly arranged with respect to the axis of the electrode 175 so that rotation of the feed rolls slowly advances the electrode section 175 in a left-hand direction as viewed in FIGURE 3 or right-hand direction as viewed in FIGURE 8.

The gear 164 is an idler gear in order to establish proper direction of rotation of the electrode feed rolls 170, 171 and 172. The bracket 148 is biased in a direction to engage the feed roll 171 with the electrode by resilient means (not shown) of conventional construction. The bracket 144 is pivotally supported by the shaft 148 so that it may be swung upwardly to disengage the feed roll 171 from the electrode.

Means is provided for releasing the member 144 to enable it to be swung upwardly about the axis of shaft 148. The member 116 is provided with bosses 174 to receive the horizontal portion 176 of a release member 178.

Secured on the portion 176 is a member 180. The member 180 is connected by means (not shown) with the bracket or member 144 to effect pivotal movement of the bracket to move the electrode feed roll 171 away from feed rolls 170 and 172 when it is desired to insert an electrode section in initially preparing the lamp for operation.

Means is provided for cooling the forward portion of the positive electrode section, preferably by water cooling. Secured to the forward end of the pedestal 112 is a member 184 which is of hollow configuration. Mounted in the upper end region of member 184 is a pair of blocks 186 of conducting material, each having a semi-cylindrically shaped recess to accommodate the electrode section 175 to embrace the electrode section. Tubes 188 project through openings in the blocks 186, the tubes being connected with the fittings 190 shown in FIGURE 2.

The fittings 190 are connected with flexible tubes 191 and 192, one of the tubes being connected with a supply of coolant such as water, the other being a return tube. Through this arrangement the forward region of the positive electrode section 175 adjacent the arc is prevented from overheating.

A web portion 113 of the pedestal 112 is of hollow configuration to provide a passage 115 which is in communication with the chamber 120 provided by the hollow base construction. In this manner, air from the chamber 120 is supplied to the region of the member 116 and bracket 144 to cool these components. Air is supplied to the chamber or space 120 of the hollow base 84 by blowers 66' and 68' driven by motors 66 and 68, shown in FIGURE 1.

The arrangement 106 for supporting and automatically feeding the negative electrode toward the positive electrode to maintain the arc is illustrated in FIGURES 4 through 7 and 15. This construction includes a pedestal or support member 200 having a base portion 202 which is supported upon the upper plate 89 of the base construction 84, a gasket 204 of insulating material being disposed between the pedestal 200 and the plate 89. The member 200 is provided with an angularly disposed portion 206 on which is supported a member 208 which has an opening 210 accommodating the negative electrode 212, the member establishing contact with the electrode.

A current supply conductor 213 is connected with the member 208 to supply current to the negative electrode. Disposed between the electrode contact member 208 and portion 206 of the pedestal is a plate or gasket 214 of insulating material. The member 208 is preferably cooled by circulating water and a fitting 216 is connected with the contact member 208 for supplying water to the contact member 208 which is of hollow configuration to accommodate the coolant.

A threaded member 218, insulated by an insulating bushing 220 from member 208 extends into a threaded opening formed in portion 206 to secure the electrode contact member 208 in position. A dowel 220 carried by the contact member 208 extends into an insulating bushing 222 carried by portion 206 to properly locate the member 208. Extending upwardly at the rear portion of the head 200 is a projection or boss portion 224 provided with an opening receiving a guide bushing 226 of insulating material which serves as a guide for the negative electrode 212.

The pedestal 200 is hollow and receives air from the base chamber 120 through an opening in the base portion 202. Air from the interior of the pedestal 200 is conveyed by a tube 223 to a region adjacent the arc to convey away volatiles from the arc. The head or pedestal is formed with portions 230 and 231 which are provided with openings receiving a shaft 232 journaled for rotation in the openings.

Secured to the lower end of the shaft 232 is a bevel gear 234 which meshes with a gear 236 mounted upon a transversely extending shaft 238, shown in FIGURE 15, disposed within the base chamber 120. The shaft 263 is driven through speed reducing gearing (not shown) by the motor 66, shown in FIGURE 1, the speed reducing gearing being of conventional construction whereby the shaft 238 is driven at a comparatively low speed in order to establish a low rate of advancement for the negative electrode 212 which burns or is consumed at a much slower rate than the positive electrode.

Secured to the upper end of the shaft 232 is a bevel gear 240 which meshes with a bevel gear 242, the latter being loosely mounted upon a tenon portion 244 of a shaft 246. The tenon portion 244 of shaft 246 extends through and is supported by a bushing 248 of insulating material, the shaft 246 being slidable and rotatable with respect to the bushing. A hub portion 250 of the gear 242 is provided with a transversely extending pin or key 252 which extends into a lengthwise arranged slot 254 in the tenon portion 244 whereby rotation of the gear 242 effects rotation of the shaft 246 but the key and slot arrangement facilitates slidable movement of the shaft 246 relative to the gear 242.

The upper region of portion 206 of the pedestal 200 is equipped with a bushing 256 which accommodates a portion 257 of the shaft 246 to form a bearing means for the shaft and to facilitate slidable and rotatable movement of the shaft. The member 208 is provided with an opening 258 to facilitate slidable movement of the shaft 246, the opening 208 being of larger diameter than the shaft portion 257 providing clearance whereby the shaft portion does not contact the member 208.

The negative electrode supporting head 200 is fashioned with a central web portion 260. Disposed at each side of the web 260 are brackets 262 secured to the web by means of screws 261. The brackets 262 are formed with pairs of openings in which are journaled shafts 263 and 264. Fixedly secured on the lower shaft 263 is a worm gear 265.

The shaft 246 is fashioned with a threaded portion or worm portion 266 which is in mesh with the worm wheel or gear 265. Also fixedly mounted upon the shaft 263 is a spur gear 267, a portion of which is shown in FIGURE 5. Fixedly secured upon the shaft 264 is a gear 268 which is in mesh with the gear 267.

Pivotally mounted upon tenon portions of the shaft 264 is a U-shaped bracket 270, and pivotally supported upon tenon portions on the shaft 263 is a similar U-shaped bracket 271. The bracket 270 is provided with openings in the leg portions thereof in which is journaled a shaft 274. The shaft 274 is provided with two drum shaped portions 275 and 276, the portion 275 being provided with a spur gear 277 which is in mesh with the spur gear 268 whereby the shaft 274 and components carried thereby are driven by the gear 268.

The portions 275 and 276 are fashioned with convergingly arranged cone shaped portions 279 having roughened surfaces for engagement with the negative electrode 212. The bracket 271, disposed beneath the electrode 212, is provided with openings in which is journaled a shaft 280. Mounted on the shaft 280 is an electrode engaging means 282 of the same construction as that mounted upon the shaft 274 and includes two drum shaped portions and two convergingly arranged cone shaped portions having roughened surfaces engageable with the negative electrode 212.

The electrode engaging assemblage 282 on the shaft 280 includes a gear similar to the gear 277 which is in mesh with the gear 267 mounted on the shaft 264 whereby the electrode engaging cone shaped surface areas 279 rotate in directions to advance the negative electrode 212 in a right-hand direction as viewed in FIGURES 4 and 5. Resilient means is provided for urging or biasing the electrode engaging surface areas 279 into frictional driving engagement with the negative electrode. Journally mounted on the outer end regions of the shafts 274 and 280 are bushings or collars 284.

Disposed between and having hook-like portions engaging the pairs of collars 284 are contractile springs 286 which exert biasing forces urging the shafts 274 and 280 toward each other and thereby urge the cone-shaped surfaces 279 into frictional engagement with the negative electrode 212. Thus the normal feed drive arrangement for the negative electrode is as follows: The level gear 234 is rotated by the bevel gear 236 mounted on the transverse shaft 238, shown in FIGURE 15.

Shaft 232 is rotated by gear 234 and the shaft 246 is rotated through the gears 240 and 242. The worm or spiral thread 266 on the shaft 246, meshing with the gear 265, effects rotation of the shaft 263 which, through the medium of gears 267 and 268, rotates the shaft 264.

Through the meshing of gears 267 and 268 with gears on the electrode engaging members mounted on the shafts 274 and 280, the negative electrode 212 is advanced at a comparatively low rate of speed by reason of the speed reducing gearing arranged between the drive shaft 238 and the motor 266, the latter being shown in FIGURE 1.

Means is provided carried by the negative head for initiating engagement of the negative electrode 212 with the positive electrode 175 to initially strike or form the arc. As shown in FIGURE 4, a stationary rod or shaft 290 is disposed in parallelism with the axis of the shaft 246 and is supported by the head 200. Mounted for slidable movement on the rod or shaft 290 is a carriage 292. The carriage 292 is inclusive of a bracket 294 which is provided at its upper end with a bifurcated portion 296, the furcations extending into a peripheral recess or groove 298 formed in the shaft 246.

The longitudinal slidable movement of the carriage 292 along the shaft 290 will effect corresponding longitudinal movement of the shaft 246. The carriage 292 includes a member 300, the lower edge of which is formed with a series of rack teeth 301, the rack teeth being in mesh with a spur gear 302 fixedly secured on a shaft 303. The head 200 is formed with aligned boss portions 304 and 305 which are bored to accommodate a shaft 303 which is journaled for rotation in the bosses.

Mounted on the outer end of the shaft 303 is a sprocket 307 connected by a chain 308 with a sprocket 309 mounted on a shaft 310, the shaft being arranged to be driven by a motor 312 shown in broken lines in FIGURE 15 and schematically in FIGURE 18. Formed upon the head 200 is a projecting portion 314 which supports housings 316 and 317, shown in FIGURE 7, containing respectively limit switches LS7 and LS8. An actuator 319 is provided for the limit switch LS7 and an actuator 320 is provided for the limit switch LS8, the actuators being brought into operation by the carriage 292.

The operation of the limit switches will be further explained in connection with the description of the circuits shown in FIGURES 17 and 18. The components of the carriage 292 are secured together by means of screws 293. In striking or forming the arc, the arc striking motor 312 is energized in a manner hereinafter described, the motor rotating the sprocket 309 and, through the chain 308, rotates the sprocket 307, shaft 303 and gear 302. As the gear 302 is in mesh with the rack teeth 301 formed on the carriage member 300, the carriage is comparatively rapidly advanced in a right-hand direction along the rod 290, shown in FIGURE 4.

As the bracket 294 is engaged with the shaft 246, the shaft 246 is simultaneously moved longitudinally. The spiral teeth 266 on the shaft 246 being in mesh with the gear 265 causes comparatively rapid rotation of the gear 265 and hence rapid advancement of the negative electrode 212 to contact or engage the extremity of the positive electrode 175, thus striking the arc.

As hereinafter explained in connection with the control circuits, after the arc is formed, the carriage 292 is returned to its initial position shown in FIGURE 4 and normal advancement of the negative electrode occurs through the gear drive mechanism hereinbefore explained through the bevel gears 234 and 236 by the shaft 238 driven by motor 66.

After the arc is struck, carriage 292 remains in its retracted position during normal operation of the negative electrode feed mechanism and is not brought into operation until the arc is extinguished and it is desired to again strike or form the arc. The arc striking mechanism is automatic in that when an operator closes a master switch as hereinafter described to initiate operation of the lamp, the negative electrode is immediately rapidly advanced through the movement of the carriage 292 to effect striking or forming the arc. If, for any reason, the arc should be extinguished, the striking mechanism will automatically re-establish the arc.

Projecting rearwardly from the head 200 is a portion 324 which supports a switch LS2 including a flexible member 326 journally supporting a roller 328 of insulating material normally adapted to engage the negative electrode 212. When the rear extremity of the negative electrode 212 moves forwardly beyond the roller 328, the arm 326 is flexed in a direction to engage contacts to energize a signal light 570, shown in the circuit of FIGURE 18, indicating that the negative electrode is to be replaced, or an additional negative electrode section joined with the electrode section then operative to produce the arc.

As shown in FIGURE 4, the electrode section 212 may be formed with a threaded tenon 332 adapted to be threaded into a bore in a succeeding negative electrode section 212'. As the negative electrode 212 burns at a slow rate as compared with the burning rate of the positive electrode, a long electrode, which may be three feet or more in length may be used and replaced when it is substantially consumed by another electrode in lieu of joining electrode sections by the threaded tenon 332.

The region of the reflector 86 adjacent the rear portion of the negative electrode head is provided with an opening to accommodate negative head components and the rearwardly extending negative electrode 212. The rear cover plate of the housing 10 is provided with an opening to accommodate the negative electrode 212 which projects rearwardly as shown in FIGURE 1.

The lamp construction of the invention includes magazine means adapted to contain a supply of positive electrode sections and automatically operable transfer means for selectively transferring electrode sections from the magazine into a position where the transferred electrode section is adapted to be joined with a partially consumed electrode section carried by the positive head forming the arc. The magazine arrangement and the transfer mechanism are supported by the base plate 89 or the base 84 so as to be movable therewith, the base 84 being movable lengthwise to adjust the focal position of the arc with respect to the reflector 86.

With particular reference initially to FIGURE 11, a transfer arm and magazine support member 340 is secured to the base plate 89 by means of bolts 342. The support 340 is provided with a platform 344 upon which is mounted a bracket 346 secured to the platform by screws 347. The bracket 346 supports the electrode section supply unit or magazine 60. The magazine includes a member 348 of planar shape lying in substantial parallelism with the side panel 15 of the lamp housing as shown in FIGURE 11.

The bracket 346 is provided with projecting bosses 350 extending through openings in the side panel 15, the bosses being bored to accommodate screws 352 threaded into openings in the member 348 for securing the magazine to the support bracket 346. The magazine member 348 is provided with vertically arranged opposed end walls 354, the opposed interior regions of the end walls being provided with vertical ribs 356 which form vertical channels 358 adapted to receive and accommodate a plurality of positive electrode sections 175' stacked one upon the other in three rows as illustrated in FIGURE 11. The recesses at the respective end walls of the magazine are of different widths, viz., the grooves of one wall fitting the normal diameter of the electrode and the grooves on the opposite wall fitting the tenon portions of reduced diameters on the other end of each electrode. Through this arrangement the electrodes must be stacked in the proper order.

A cover plate 62 is secured to the member 348 by screws 63. The bracket 346 is provided at each end region with laterally extending projections 360 and 361 having aligned openings to accommodate a shaft 364 upon which is supported an electrode selector drum construction 61 shown in FIGURE 12.

Secured to the projection 360 of the bracket 346 is a motor 366 having a mounting plate 367 secured to the projection 360 by means of screws 368. The motor 366 is connected with the shaft 364 and is arranged to rotate the shaft through one complete revolution during each electrode section transferring operation.

The electrode selector construction 61, shown in FIGURE 12, includes substantially circular end portions or plates 370 integrally joined by webs 372, the plate and web assembly being secured to the shaft 364. Each end plate 370 is provided with a U-shaped recess 374 of a dimension to receive the end of a positive electrode section 175' in the manner illustrated in FIGURE 12. The ends of the recesses 374 in the plate 370 are closed by means of closure members 376 held in place by screws 377 to prevent endwise movement of an electrode section when disposed in the recesses.

With particular reference to FIGURE 11, it will be seen that during one revolution of the electrode isolating means 61 in a counterclockwise direction as viewed in FIGURE 11, when the recesses 374 in the peripheries of the plates 370 are aligned with an electrode section 175' in the outermost column of electrode section in the magazine, the lowermost electrode of the stack will enter the recesses 374 by gravity. Further rotation of the selector 370 brings the selected electrode into a position to be received by a relatively movable electrode transfer mechanism now to be described. The electrode transfer mechanism is best illustrated in FIGURES 3, 8 and 11.

As particularly shown in FIGURE 8, the support member 340 is provided with portions 380 and 381 which are bored to accommodate respectively anti-friction or ball bearings 382 and 383. One end of a shaft 386 is journaled in the bearing 382, the shaft 386 having a threaded or worm portion 388 and a reduced diameter tenon portion 389 which is journaled in the anti-friction bearing 383. Mounted upon a portion 390 of the support 340 is a motor 392, the motor shaft 393 being connected with the tenon portion 389 of shaft 386 through a coupling 394.

The electrode section transfer means includes a rectangularly shaped skeleton-like frame or transfer arm 398 provided with bosses or pad portions 399 and 400. Insulatingly secured to the pad portion 399 is a member 402, the member having a central bore accommodating an interiorly threaded bushing 404, the threaded portion of the bushing accommodating the threaded or worm portion 388 of the shaft 386. From FIGURE 8 it will be noted that rotation of the worm 388 effects longitudinal movement of the member 402 and the transfer frame or arm 398.

The pad portion 400 of the transfer frame or member 398 is insulatingly secured to a portion 406 of member 402. Contained within the portion 406 is a bushing 408 which supports a ball bearing 410 whereby the member 402 is arranged for rotation independently of the bushing 410.

A portion of the shaft 386 is splined and the bushing 408 correspondingly recessed whereby the bushing is rotatable with the shaft and is slidable longitudinally on the shaft.

Arranged adjacent the member 406 is a housing 412 which encloses an electromagnetic clutch 414.

The magnetic clutch 414 is adapted to be energized to effect rotational movement of the transfer frame or arm 398 about the axis of the shaft 386 in order to effect transfer of a positive electrode section from the recesses 374 in the drum plates 370 to the extreme left-hand position shown in broken lines in FIGURE 11 to dispose the transferred electrode section in axial alignment with the electrode section 175 which forms the arc and is being advanced by the feed mechanism of the positive electrode supporting head 104, shown in FIGURE 3.

Through this arrangement, the electrode transfer frame 398 is rotatable about the axis of the shaft 386 to transfer an electrode from the magazine to a position aligned with the positive electrode section carried by the positive head and is movable lengthwise upon further rotation of the shaft 386 through the threaded interconnection of the threaded portion 388 of the shaft with the threaded bushing 404 carried by the member 402. Lengthwise movement of the frame 398 is effective to join the electrode section 175' to the electrode section 175 shown in FIGURE 8 in the manner hereinafter described.

The transfer member or arm 398 is equipped with relatively movable means carried by the transfer arm 398 to support an electrode section during transfer of the electrode section away from the magazine 60. The transfer arm 398 is provided with bosses 418 containing aligned openings forming journal supports for a shaft 419, the end regions of the shaft extending beyond the bosses 418. Fixedly secured on each projecting end region of the shaft 419 is an arm 420.

The transfer frame arm 398 is provided with boss portions 421 provided with aligned openings to accommodate a shaft 422. Secured on the shaft 422 adjacent each boss 421 is a second arm 424. Each pair of members 420 and 424 is connected by a link 426. The upper ends of the links 426 are pivotally connected to the members 424 by means of pivot pins 428. The lower ends of the links 426 are connected to the arms 420 by means of pivot pins 430. Supported on the member 406 is a projection 432 upon which is mounted a pin 434, shown in FIGURES 8 and 11. Connected to the pivot pin 430 of the left-hand link 426 as viewed in FIGURE 8 and the projection 434 is a contractile spring 436.

It will be noted from FIGURE 11 that when the transfer frame 398 is in the extreme right-hand position, a line through the axis of the pin 430 and the axis of the projection 434 is at the right-hand side of the axis of the shaft 419.

As the pivot pin 430 and projection 434 are connected by the contractile spring 436, the arrangement serves as a toggle means to bias the arms 420 for movement about the shaft 419 in a clockwise direction as viewed in FIGURE 11 and, through the medium of the links 426, urge the arms 424 into a position to receive a positive electrode section 175' in the curved recess 438 formed at the upper end of each of the projections 440 provided on the transfer arm 398.

Means is provided for rotating the shaft 419 when the electrode transfer arm 398 approaches the full line position shown in FIGURE 11. Mounted upon the right-hand end of the shaft 419, as viewed in FIGURE 8, is a member 442 which, when the transfer arm 398 approaches its full line position shown in FIGURE 11, engages an abutment on member 340 to rotate the shaft 419 through a partial revolution in a counterclockwise direction causing the arms 420 and 424 to be pivoted about their respective supports 419 and 422 to reset the upper arms 424 to a position to provide with the curved recesses 438 in the projections 440 a means to receive an electrode section from the magazine.

The recesses 374 in the drum plates 370 upon rotation of the member 61 receive an electrode section from the magazine and move the same to a position in registration with the curved recesses 438 in the projections 440 at a region below the center of rotation of the member 61 whereby the electrode section in the recesses 374 falls by gravity into the cradle or recesses 438 in the projections 440.

A cam member 443 on the shaft 419 is arranged to engage a pin 445 carried by a stationary block 447 whereby on movement of the arm 398 in a right-hand direction, as viewed in FIGURE 8, the cam engages the pin 445 to rotate shaft 419 and swing the arms 424 away from the transferred electrode section to enable the transfer arm to swing to its initial electrode receiving position shown in full lines in FIGURE 11.

The operation of the electrode transfer mechanism is initiated by a limit switch LS1 mounted on a pedestal 446, shown in FIGURE 8, supported on the base 84. The limit switch LS1 is provided with an upwardly extending member 448 which normally engages the peripheral surface of the electrode section 175 being supported and advanced by the positive head 104 and forming the arc. When the electrode section 175 is partially consumed and advanced whereby the rear end of the electrode section 175 moves out of engagement with the arm 448, the arm 448 under spring bias moves to a position to actuate the limit switch LS1 and initiate operation of the transfer mechanism as hereinafter described.

Means is provided associated with the positive electrode section transfer arm 398 for exerting lengthwise pressure upon the transferred electrode section 175' when the same is aligned with the electrode section 175. Mounted upon the left-hand end of shaft 422 as viewed in FIGURE 8 is a member or abutment 452 adapted to engage the rear end of the transferred electrode section 175' in alignment with the electrode section 175.

Fixed on the shaft 422 is a collar 454 and disposed between the collar 454 and a boss 456 formed on the transfer arm 398 is a coil spring 458.

During an electrode joining operation to be hereinafter described, the electrode transfer arm 398 is moved lengthwise in a right-hand direction as viewed in FIGURE 8 by rotation of the shaft 386. As this movement takes place, the coil spring 458 is compressed by movement of the electrode transfer frame 398 in a right-hand direction, the shaft 422 remaining substantially stationary with the member 452 in engagement with the rear of the transferred electrode section.

The coil spring 458, being compressed, exerts lengthwise pressure on the electrode section 175' urging it toward the electrode section 175. The arms 424 are mounted upon bushings 425 to facilitate pivotal movement of the arms 424 about the axis of shaft 422 and enable the relative slidable movement of shaft 422 with respect to the electrode transfer frame 328. Detailed operation of the electrode transfer mechanism will be hereinafter described in connection with the control circuits.

The invention is inclusive of an arrangement for automatically joining the transferred electrode section with the partially consumed electrode section so as to establish continuity of arc operation. The method of joining electrode sections involves the softening or fusing of a heat-softenable resin pellet or disc carried by each electrode section wherein the resin is softened or conditioned to join or bond adjacent ends of electrode sections together.

The electrode section joining arrangement is particularly shown in FIGURES 3, 8, 9, 10 and 14. As shown in FIGURE 9, the forward end of the electrode section 175' is provided with a cylindrical recess or bore 470. Disposed in the recess in each electrode section 175' is a pellet or disc 472 of a heat-softenable resin. The electrode sections 175' are provided with the resin pellets before they are placed in the magazine 60.

The rear end of each electrode section is formed with a cylindrically-shaped tenon 474 which is adapted to mate with or fit into the bore 470 in the opposite end of an electrode section. Mounted upon the pedestal 446, shown in FIGURE 8, is a semi-annular member 478, the ends of which mate with ledges 480 formed on the upper end of the pedestal 446, as shown in FIGURE 10. Suitable screws 481 secure the member 478 to the ledge portion 480. The upper region of the pedestal 446 is fashioned with a semi-cylindrical surface 482 which forms with the semi-cylindrical surface 483 an oven or chamber 485 of cylindrical shape, as shown in FIGURES 9 and 10.

Electrically energizable heating means 488 is disposed within the oven or chamber 485 for applying heat to the engaging adjacent ends of electrode sections to heat-soften or condition the resin 472 to join or bond the electrode sections together.

In the embodiment illustrated the electrically energizable heating element is of the resistance type in the form of a spiral coil 488, the respective ends of the coil being connected with terminal members 490 and 491. As shown in FIGURE 10 the terminal 490 is insulated from the semi-annularly shaped member 478 by an insulating bushing 492.

The terminal 491 is insulated from the member 478 in the same manner by a second bushing of insulating material. Conductors or leads 494 and 495 conduct current to the heating element 488 from a low voltage transformer TRS-1 shown in circuit diagram, FIGURE 17. As particularly shown in FIGURES 9 and 10, the spiral heating element 488 is of a diameter to facilitate advancement of the electrode sections through the coil without engaging the coil. The forward end of an electrode section entering the chamber 485 is properly guided by fingers 497 formed on a disc-like guide member 498 secured to the entrance end of the chamber 485, the plate 498 being secured to member 478 by a screw 499.

When each successive electrode section is moved into the position shown in FIGURE 9 the heating element or coil 488 is energized as hereinafter described to generate heat sufficient to fuse or soften the resin pellet 472 and thereby join or bond the adjacent electrode sections together.

It should be noted that during the period that a transferred electrode section 175' is moved lengthwise the electrode is biased under the force of the spring 458 to assure pressure of electrode section 175' upon the adjacent section to assure an effective bond between the electrodes provided by the softened resin 472.

The pedestal 446 is of hollow configuration providing a passage 502 through which air flows from an air tube 503 disposed in the hollow base 84 upwardly adjacent each transferred electrode section 175' so as to prevent premature softening of the resin pellet until after the adjacent ends of electrode sections are well within the chamber or oven 485 in the position shown in FIGURE 9. The cooling air flowing through the passage 502 and tube 503 is provided by the blower 71 driven by a motor 72, shown in FIGURE 2.

The lamp construction of the invention embodies a lenticular lens system for concentrating and controlling the radiant energy from the arc. With particular reference to FIGURE 15, there is disposed adjacent the forward end of the lamp housing a lenticular lens 510. The lenticular lens 510 has its central axis preferably aligned with the axis of the positive electrode. A second lenticular lens 512 of larger diameter is disposed within the lamp housing between the electrode transfer frame or arm 398 and the oven unit 110, as shown in FIGURE 15.

The central axis of the lenticular lens 512 is coincident with the axis of the lens 510. As shown in FIGURE 16, the lens 512 is provided with an arcuate slot 514, the curved edges defining the slot 514 being generated about the axis of shaft 386 which supports the electrode transfer frame 398. The purpose of the slot 514 is to accommodate transfer of a positive electrode section 175' by the arm 398 into aligned relation with the positive electrode section carried by the head 104.

Each lenticular lens is made up of a large number of small lenses 511, the lenticular lens arrangement being of the character disclosed in the United States patent to Schering and Merz 2,183,249. With this lens system, a greatly increased amount of radiant energy can be projected to the work area. This lens system enables the intensity of the radiant energy to be varied without varying the uniformity of energy distribution.

An aperture plate 516 is disposed in the cylindrical casing 18 and is provided with an energy transmitting aperture 518 of the same shape as one of the small lenses 511 through which is projected radiant energy from the reflector and lens system derived from the arc. Different aperture plates having different sizes and shapes of apertures may be used in the system. The projected radiant energy passing through the aperture 518 may be passed through additional lenses (not shown) contained within the casing 18 depending upon the particular use for the energy.

An image screen 524, shown in FIGURE 1, is mounted on the cover 14 of the lamp housing. The screen 524 receives an image from an angularly positioned mirror 526 carried by a bracket 528 secured to the cover. An opening in the cover beneath the mirror 526 admits the image of the arc to be directed upon and reflected by the mirror 526 onto the screen 524. Disposed within the lamp housing at the forward end thereof is a lamp dowser (not shown) of conventional construction which is moved into and out of energy obstructing position by means of a handle 530, shown in FIGURE 2.

The arc circuit and the control circuits for the electrode feed motors 66 and 68 have not been shown herein but are of the character disclosed in United States Patent 3,104,066. The arc circuit includes an arc current selector 540 and an ammeter 542 shown in FIGURE 2. Also extending from the lamp housing is a crank member 544 for manually adjusting the feed mechanism for the positive electrode, and a second crank member 546, shown in FIGURE 2, for manually adjusting the negative electrode feed mechanism in a conventional manner. Control members or knobs 548 and 550, shown respectively in FIGURES 1 and 2, provide an adjusting means for adjusting the tilt of the reflector to properly redirect the radiant energy from the arc to the lenticular lens system.

The control circuits for the automatic striking mechanism, actuation of the electrode transfer mechanism and energization of the heating unit for the electrode joining means are illustrated in FIGURES 17 and 18. The operation of the various components, the switch mechanisms and relays will be described in connection with the explanation of the control circuits. In the operation of the lamp construction, the magazine 60 is first loaded with a supply of positive electrode sections or carbons, each having a small quantity or pellet of heat-softenable bonding resin 472 in the recess at the end of each electrode section.

A positive electrode section is inserted manually in the head construction 104 by manually actuating the handle member 178 to pivotally move the bracket 144 and feed roll 171 to a position to enable the electrode to be advanced through the feed rolls. A negative electrode or carbon 212 is manually inserted through the guide bushing 226 and between the feed rolls 276, shown in FIGURES 4 and 5. An exhaust blower (not shown) is connected with the vent tube 78, shown in FIGURE 1, and is energized.

Single phase alternating current supply is provided for the control circuit through leads L1 and L2, shown in FIGURE 17. Three phase alternating current is connected with the rectifier 554 of conventional construction, shown schematically in FIGURE 18, by current supply leads L3, L4 and L5 and power thus supplied to the rectifier 554, the current being rectified and conveyed to the arc circuit through leads 556 and 558, shown in FIGURE 18.

The switch SW–1, shown in FIGURE 17, is manually closed to energize the control circuit, this action energizing a rectifier fan motor 558, shown in FIGURE 18.

The arc "power on" switch 560, shown in FIGURE 17, is then closed energizing the arc power contactor 562, shown in FIGURES 17 and 18, this action supplying three phase current to the rectifier 554. This action also closes contact 564 sealing in contactor coil of contactor 562. The "arc power on" light LT–6 is on. Relay coil R3, shown in FIGURE 18, is energized through contact R4–2, limit switch LS–7 and contact 564. Contacts R3–1 and R3–2 close, energizing the arc strike motor 312, shown in broken lines in FIGURE 15 and in FIGURE 18.

With particular reference to FIGURES 4 and 7, the energization of the arc strike motor 312 rotates shaft 310, shown in FIGURE 7, sprocket 309, chain 308, sprocket 307 and shaft 303, to rotates the pinion or gear 302. The gear 302 is in mesh with the rack teeth 301 of the carriage 292, and rotation of gear 302 advances the carriage 292 in a right-hand direction, as viewed in FIGURE 4 The bracket 294 of the carriage 292 engages in the recess 298 in shaft 246 and moves the shaft with the carriage.

The threaded portion 266 of shaft 246 engages the gear 265 which causes the negative electrode feed rolls 275 and 276 to advance the negative electrode 212 until it engages the extremity of the positive electrode 175. Upon engagement of the negative and positive electrodes, the arc circuit is completed and the arc is established.

The current relay CR in the rectifier circuit (FIGURE 18) closes, energizing the timer T-2 in the rectifier input circuit setting the timer in operation. Relay R4 is energized opening contacts R4-1 and R4-2 and closing contact R4-3.

Relay R3 is de-energized, opening contacts R3-1 and R3-2. At the same time, relay R5 coil is energized through the rear limit switch LS-8. Contacts R3-1 and R5-1 close and the strike motor 312 reverses its direction of rotation. Timer contact T-2 closes energizing contactor coil R6 of the input circuit of the rectifier. The energizing contactor coil R6 establishes a bypass circuit around reactors (not shown) in the rectifier input circuit placing full voltage on the arc.

The reversing of the arc strike motor 312 moves the carriage 292 (shown in FIGURE 4) in a left-hand direction, as viewed in FIGURE 4, to its initial position. Upon reaching its initial position, it opens the rear limit swtch LS-8 which de-energizes relay R5. Contacts R5-1 and R5-2 open to de-energize the strike motor 312.

The established arc continues in operation and the positive and negative electrodes, through the arc control circuit (not shown), are advanced at the proper rates of speed by the motors 68 and 66, shown in FIGURE 1. The negative electrode 212, as shown in FIGURE 1, is of substantial length and projects rearwardly of the lamp housing. The rate of burning of the positive electrode is many times the rate of burning of the negative electrode and may be in the neighborhood of a ratio of eleven to one.

Hence the positive electrode sections are consumed quite rapidly. In the present invention, a succeeding positive electrode section is moved into a position to be joined with the partially consumed electrode section establishing the arc. The control circuit and operation of the components for transferring a positive electrode section or carbon and performing the joining of the positive electrode sections are as follows: With reference to FIGURE 8, the positive electrode section 175, establishing the arc, is continuously advanced in a right-hand direction by the feed rolls 172 to maintain constant the arc between the electrodes through the arc current control (not shown).

When the electrode section 175 is advanced to a point where the electrode 175 moves out of engagement with the spring arm 448 of the limit switch LS-1, the limit switch LS-1 is moved to close contact a and open contact b. The magazine motor 366 is energized through contact a of limit switch LS-1 and contact b of LS-3. The energization of the motor 366 rotates the drum member 61 through a single revolution.

With reference to FIGURE 11, it will be seen that during the single revolution of the drum member 61 the recesses 374 in the plates 370 receive an electrode section 175' from the magazine 60, continued rotation of the drum bringing the removed or isolated electrode section into registration with the curved or cradle configuration 438 of the projections 440 of the transfer frame 398 and arms 424 which are then in the full line position illustrated in FIGURE 11.

The arms 420 and 424 are in their uppermost positions, as shown in FIGURE 11, whereby the curved portion of each of the arms 424 engages the electrode section on the transfer frame to hold the electrode section in position for transfer to a position in alignment with the positive electrode section establishing the arc. During rotation of the drum, limit switch DR-1 closes. The limit switch DR-2 closes momentarily energizing relay coil R2. Relay R2 seals in through interlock contact R2-1 and forward limit switch LS-4. Contact R2-2 is closed to supply DC current to the magnetic clutch 414.

Contacts R2-3 and R2-4 are closed to energize motor 392. Contact R2-5 is open. Motor 392 being energized is rotated and moves electrode transfer frame 398 from the full line position, shown in FIGURE 11, to the broken line position at the extreme left bringing the electrode section 175' into alignment with the proceeding electrode section 175. An adjustable stop means (not shown) positions the transfer frame 398 in proper electrode aligning position.

During this movement of the transfer frame, rotation of the motor is transmitted to the transfer frame through the energization of the electromagnetic clutch 414, shown in broken lines in FIGURE 8. When the transfer frame 398 is moved to its electrode transfer position, limit switch LS-5 is opened de-energizing the clutch 414. Contact b of limit switch LS-3 opens and contact a closes.

The motor continues rotation and such continued rotation advances the transfer arm 398 in a right-hand direction, as viewed in FIGURE 8, due to the threaded connection bushing 404 of member 402 of arm 398 with the threaded portion 388 of the shaft 386.

During this lengthwise movement of the transfer arm 398, the abutment 452 mounted on shaft 422, engages the rear end of the transferred electrode section 175' and exerts pressure in a right-hand direction on said electrode section to telescope the rear tenon portion 474 on electrode section 175 in the recess at the forward end of the succeeding electrode section 175'. The drum 61 continues to rotate through one complete revolution through the limit switch DR-1 which is opened at the end of the said complete revolution stopping the motor 366 in preparation for transfer of a succeeding electrode section when the same is required.

The transfer frame 398 travels to its extreme forward position and upon reaching this position operates limit switch LS-4 opening LS-4 (a) and closing LS-4 (b). The relay R2 drops out opening contacts R2-1, R2-3, R2-4 and R2-2. Contact R2-5 closes and motor 392 ceases rotation.

During the forward motion of transfer arm 398 in a righthand direction, as viewed in FIGURE 8, the coil spring 458 is being progressively compressed which increases the pressure of the abutment 452 acting lengthwise on the electrode section 175' to interlock the tongue and recess arrangement of the adjacent ends of the electrode sections with the resin pellet 472 between the electrodes in an unsoftened or unfused condition.

A thermal timer T-1 is energized through the closing of contact b of LS-4. The thermal timer determines the period that the transfer arm 398 is in forward position. The oven heating means 488 is energized when the transfer arm 398 is moved from its full line position to FIGURE 11 to soften or fuse the resin pellet 472 to join the adjacent ends of the electrode sections together. The movement of the transfer arm actuates limit switch LS-3 from contact b to contact a causing the transformer TRS1 to supply electric energy to the heating element 488. When the timer expires, T-1 closes. Relay R-1 is energized through LS-3 (a), T1 and R2-5.

Contact R1-2 holds in relay R1-1. Contacts R1-3, R1-4 and R1-5 close. This action reverses the direction of rotation of motor 392 which reverses rotation of the shaft 386 and threaded portion 388 and retracts the electrode transfer frame 398 to its initial position illustrated in FIGURE 8. During movement of the electrode transfer frame 398 in the right-hand direction, as viewed in FIGURE 8, the cam 443 on the shaft 419 engages an abutment pin 445 on the member 447 rotating the shaft 419 in a direction to move the arms 420 and 424 downwardly in a counterclockwise direction as viewed in FIGURE 11 to retract the arms 424 from electrode section engaging position.

The forward limit switch LS-4 resets to the position LS-4 (a) and limit switch LS-5 closes energizing the clutch 414 through R1-5. As the clutch is energized, the transfer frame 398 is again magnetically locked to the shaft 346 whereby the transfer frame 398 is swung to the full line position, shown in FIGURE 11, that is, in a position to receive a succeeding electrode section from the magazine 60 upon subsequent rotation of the rotatable drum unit 61.

The transfer frame 398 upon reaching this position operates limit switch LS-3 closing contact LS-3 (b) and opening LS-3 (a). Relay R1-1 is thus de-energized opening contacts R1-2, R1-3, R1-5 and R1-4 causing the motor 392 to be de-energized. The transfer arm 398 remains in this initial position until the electrode section, which has been transferred into operative position and joined with the previous electrode section is partially consumed by the burning of the arc until the electrode moves past the arm 448, shown in FIGURE 8, to again energize the limit switch LS-1 and initiate a subsequent cycle of electrode transferring and electrode joining operations.

A limit switch LS-2 (FIGURE 4) is provided in series with a signal light 570 which is operative to indicate that approximately a three hour supply of negative electrode or carbon 212 remains. When the supply of positive electrode sections 175' in the magazine 60 is depleted so that there are approximately enough sections remaining for a two hour period, a limit switch LS-6, (FIGURE 17) closes energizing a pilot light 572 shown in circuit diagram, FIGURE 17.

Through this arrangement, continuous operation of the arc is assured for twenty-four hours or more without interruption as the magazine 60 is of a size to contain a sufficient supply of positive electrode sections to provide for such continuous operation.

The negative electrode 212 may be of substantial length sufficient to continue uninterrupted arc formation for twenty-four hours or more. If further continuous operation is desired, the magazine 60 may be refilled with additional positive electrode sections and a second electrode section 212' may be joined with the negative electrode section 212 through the threaded tenon connection 332 illustrated in FIGURE 4.

It is to be understood that the magazine arrangement and electrode section transfer means herein disclosed for use with the positive electrodes may be employed in connection with a supply of negative electrode sections which may be transferred to operative position and individual negative electrode sections joined to a partially consumed negative electrode section in the same manner as the positive electrode sections are transferred to arc forming position and joined to a partially consumed electrode section.

With the above arrangement, the production of radiant energy through the continuous uninterrupted maintenance of the arc is entirely automatic. Through the provision of the lenticular lens system, illustrated in FIGURE 15, a high concentration of high intensity radiant energy from the arc is directed onto and reimaged at the spot or area 518 in the aperture plate 516. Furthermore, through the use of the lenticular lens system, the intensity of the arc may be varied but the distribution of the radiant energy projected through the lens system will be substantially uniform, simulating very closely solar energy.

Through the automatic control of the arc the radiant energy has a high degree of stability which is of substantial importance where energy of constant intensity is desired. The radiant energy projected through the aperture 518 in the aperture plate 516 may be projected through additional lenses (not shown) disposed forwardly of the aperture plate 516. While the individual lenses of the lenticular lenses 510 and 512 are preferably of hexagonal shape and the aperture 518 likewise of hexagonal shape, it is to be understood that other shapes of individual lenses of the lenticular lenses may be used such as a rectangular shape.

The intensity of the radiant energy may be varied or controlled by masking symmetrical portions of one or both of the lenticular lenses 510, 512. A masking plate 513, shown in FIGURE 15, preferably of the iris type may be employed for the purpose. The lenticular lens system improves the uniformity of projected radiant energy which is important for solar simulation as it enables the coverage of a larger area with the same uniformity.

The lenticular lens system, in combination with the automatic feed control of the electrodes, maintains a high degree of stability of the arc and hence a high degree of stabiilty of radiant energy. A high degree of stability of radiant energy enables the maintenance of the right proportion of spectral distribution in the radiant energy.

It is apparent that, within the scope of the invention, modifications and different arrangements may be made other than as herein disclosed, and the present disclosure is illustrative merely, the invention comprehending all variations thereof.

I claim:

1. A method of establishing and maintaining an arc between positive and negative electrode sections including supplying current to positive and negative electrode sections, advancing the negative electrode into engagement with a positive electrode to strike the arc, feeding both electrodes toward each other at speed rates to maintain the arc substantially constant and at a predetermined region, establishing a supply of positive electrode sections, isolating a positive electrode from the supply by a movable selector, transferring the isolated electrode section from the selector to a position adjacent a partially consumed positive electrode section forming the arc, exerting resilient pressure on the transferred electrode section lengthwise thereof, and applying heat to a bonding medium between the transferred electrode section and the partially consumed positive electrode section to join the sections together.

2. A method of establishing and maintaining an arc between positive and negative electrode sections including supplying current to positive and negative electrode sections, advancing the negative electrode into engagement with a positive electrode to strike the arc, feeding both electrodes toward each other at speed rates to maintain the arc substantially constant and at a predetermined region, establishing a supply of positive electrode sections, transferring an electrode section from the supply to a position adjacent a partially consumed positive electrode section forming the arc, exerting resilient pressure upon the transferred electrode section lengthwise thereof to bias the transferred section toward the partially consumed electrode section forming the arc, applying heat to a heat-softenable bonding resin between the transferred electrode section and the partially consumed electrode section to bond the sections together, and directing a cooling medium onto the electrode adjacent the region of application of heat to avoid premature softening of the bonding resin.

3. A method of establishing and maintaining an arc between positive and negative electrode sections including supplying current to positive and negative electrode sections, initially advancing the negative electrode into engagement with a positive electrode to strike the arc, feeding both electrodes toward each other at speed rates to maintain the arc substantially constant and at a predetermined region, establishing a supply of positive electrode sections, isolating an electrode section from the supply by a movable selector, transferring the isolated electrode section from the selector to a position adjacent and in alignment with a positive electrode section forming the arc, moving the transferred electrode section toward the electrode section forming the arc by exerting resilient bias lengthwise on the transferred electrode section, and applying heat to a heat-softenable resin disposed between the transferred electrode section and the positive electrode section forming the arc to bond the sections together.

4. In combination, an arc lamp having a housing, positive and negative electrode sections in said housing arranged to produce an arc, means for supporting a positive electrode section, means for supporting a negative electrode section, means for initially engaging the electrode sections to strike the arc, motive means for concomitantly advancing the positive and negative electrodes at relative speeds effective to maintain the arc at a predetermined region in the housing, a reflector for collecting and projecting radiant energy from the arc, means providing a supply of positive electrode sections, a relatively movable selector for isolating an electrode section from the supply means, motive means for actuating the electrode section isolating selector, an electrode section transfer member, motive means for moving said transfer member to transfer an isolated electrode section from the electrode selector to a position aligning the transferred electrode section with the positive electrode section forming the arc, a bonding material carried by one end of a positive electrode section, resilient means for biasing the transferred electrode section to engage the bonding material with the adjacent electrode section, and means for conditioning the bonding material to join adjacent ends of the electrode sections together.

5. In combination, an arc lamp having a housing, positive and negative electrode sections in said housing arranged to produce an arc, feeding means for supporting and advancing a positive electrode section toward the arc, feeding means for supporting and advancing the negative electrode section toward the arc, means associated with the negative electrode for initially rapidly advancing the negative electrode into engagement with the positive electrode to strike the arc, motive means for driving the feeding means for the positive and negative electrodes at relative speeds effective to maintain the arc at a predetermined region in the housing, a reflector for collecting and projecting radiant energy from the arc, means providing a supply of positive electrode sections, a rotatable member for isolating an electrode section from the supply, motive means for rotating the electrode section isolating member, an electrode transfer arm, motive means for moving said transfer arm to transfer an isolated electrode section from the electrode isolating means to a position aligning the transferred electrode section with the positive electrode section forming the arc, a quantity of heat-softenable resin carried by the arc, a quantity of heat-softenable resin carried by one end of a positive electrode section, means for exerting lengthwise pressure on the transferred positive electrode section to engage the quantity of resin with the adjacent electrode section, heating means for conditioning the resin to bond the adjacent ends of the electrode sections together, said transfer arm actuating motive means being arranged to return the transfer arm to a position to receive an electrode section from the electrode section isolating member.

6. In combination, an arc lamp having a housing, positive and negative electrode sections in said housing arranged to produce an arc, means for supporting and advancing a positive electrode section toward the arc, means for supporting and advancing the negative electrode section toward the arc, means associated with the negative electrode for initially rapidly advancing the negative electrode into engagement with the positive electrode to strike the arc, a reflector for collecting and projecting radiant energy from the arc, means providing a supply of positive electrode sections, a rotatable member for isolating a positive electrode section from the supply, motive means for rotating the electrode isolating member, a relatively movable electrode section transfer frame, said transfer frame in one position being arranged to receive an isolated electrode section from the rotatable member, motive means for actuating said electrode transfer frame for transferring an electrode section to a position adjacent the positive electrode section forming the arc, means for moving the transferred electrode section to bring the adjacent ends of the transferred electrode section and the positive electrode section forming the arc in adjacent relation, heat-softenable means between the adjacent ends of the said electrode sections, and electrically energizable heating means for fusing the heat-softenable means to join the transferred electrode section to the electrode section forming the arc.

7. In combination, an arc lamp having a housing provided with a base member, positive and negative electrode sections in said housing arranged to produce an arc, means mounted on the base member for supporting a positive electrode section, means mounted on the base member for supporting and advancing the negative electrode section toward the arc, means associated with the negative electrode for initially rapidly advancing the negative electrode into engagement with the positive electrode to strike the arc, motive means for advancing the positive and negative electrodes at relative speeds effective to maintain the arc at a predetermined region in the housing, a reflector for collecting and projecting radiant energy from the arc, means for effecting adjustment between the base member and the reflector to position the arc at the focal point of the reflector, means providing a supply of positive electrode sections, a relatively movable electrode section transfer member, an electric motor for moving the transfer member, means set into operation when the positive electrode is consumed to a predetermined length to energize the electric motor and thereby effect movement of the transfer member to transfer an electrode section from the supply into alignment with the partially consumed electrode section, and means for joining an end of the transferred electrode section with the rear end of the partially consumed electrode section to effect continuous operation of the arc.

8. In combination, an arc lamp having a housing, positive and negative electrode sections in said housing arranged to produce an arc, means for mounting a positive electrode section, drive means for advancing the positive electrode section, means for mounting a negative electrode section, said negative electrode mounting means including a shaft mounted for rotational and lengthwise movement, said shaft having a threaded portion, relatively stationary bracket means, a gear journally supported on the bracket means in engagement with the threaded portion of the shaft, a pair of members pivotally supported by the bracket means, electrode engaging feed rolls carried by said pivotally supported members, means actuated by the gear in engagement with the threaded portion of the shaft for rotating the electrode feed rolls upon rotation of the shaft, a slidably mounted carriage having a portion engageable with the shaft, said carriage having rack teeth associated therewith, a spur gear in mesh with the rack teeth, reversible motive means arranged to rotate said spur gear in engagement with the rack teeth for moving the carriage to advance the negative electrode into engagement with the positive electrode to strike the arc and to retract the carriage after the arc is formed, and drive means for rotating the shaft to normally advance the negative electrode toward the positive electrode to maintain the arc.

9. In combination, an arc lamp having a housing, positive and negative electrode sections in said housing arranged to produce an arc, support means for the positive electrode section, drive means for advancing the positive electrode section, support means for the negative electrode section, said negative electrode support means including a shaft mounted for rotational and lengthwise movement, said shaft having a threaded portion, relatively stationary bracket means, a gear journally supported on the bracket means in engagement with the threaded portion of the shaft, a pair of members pivotally supported by the bracket means, feed rolls carried by said pivotally supported members engaging the negative electrode, means actuated by the gear in engagement with the threaded portion of the shaft for rotating the electrode feed rolls upon rotation of the shaft, a carriage slidable on the support means for the negative electrode and having a portion engaging in a recess in the shaft, said carriage having rack teeth associated therewith, a spur gear in mesh with the rack teeth, electrically energizable reversible motive means arranged to rotate said spur gear in engagement with the rack teeth for moving the carriage to advance the negative electrode into engagement with the positive electrode to strike the arc and to retract the carriage after the arc is formed, and drive means for rotating the shaft to normally advance the negative electrode toward the positive electrode to maintain the arc.

10. In combination, an arc lamp having a housing provided with a base member, a first head mounted on the base member arranged to support a positive electrode section, a second head mounted on said base member arranged to support a negative electrode, feed roll means for said positive electrode carried by the first head, feed roll means carried by the second head for advancing the negative electrode, motive means for driving the feed roll means for the positive electrode, a second motive means for driving the negative electrode feed rolls, a third motive means, means arranged to be driven by said third motive means for rapidly advancing the negative electrode into engagement with the positive electrode to form the arc, a magazine supported by the base member and adapted to contain a supply of positive electrode sections, a support mounted on the base member, a shaft journally mounted by the support, a fourth motive means arranged to rotate the shaft, an electrode section transfer means mounted upon the shaft, means associated with said shaft adapted to effect a driving connection of said transfer means with said shaft whereby said transfer means is adapted for rotational movement with the shaft, said transfer means being arranged to receive an electrode section from the magazine and transfer the electrode section into a position adjacent the positive electrode section forming the arc, said transfer means being movable lengthwise of the shaft upon rotation of the shaft for moving the transferred section toward the positive electrode section forming the arc, and means for joining the transferred electrode section with the electrode section forming the arc.

11. In combination, an arc lamp having a housing provided with a base member, a first head mounted on the base member arranged to support a positive electrode section, a second head mounted on said base member arranged to support a negative electrode, feed roll means for said positive electrode carried by the first head, feed roll means carried by the second head for advancing the negative electrode, motive means for driving the feed roll means for the positive electrode, a second motive means for driving the negative electrode feed rolls, a third motive means, means arranged to be driven by said third motive means for rapidly advancing the negative electrode into engagement with the positive electrode to form the arc, a magazine supported by the base member and adapted to contain a supply of positive electrode sections, a support mounted on the base member, a shaft juornally mounted by the support, a fourth motive means arranged to rotate the shaft, an electrode section transfer arm supported by the shaft, an electromagnetic clutch associated with said shaft adapted to effect driving connection of said transfer arm with said shaft whereby said transfer arm is adapted for rotational movement with the shaft when the electromagnetic clutch is energized, relatively movable means adjacent the magazine for selectively removing an electrode section from the magazine and transferring the selected electrode to the electrode transfer arm, said clutch arranged to effect rotational movement of the transfer arm upon rotational movement of the shaft to transfer the selected electrode section into a position adjacent the positive electrode section forming the arc, said transfer arm being movable lengthwise of the shaft upon rotation of the fourth motive means, resiliently supported abutment means carried by the transfer arm engageable with the transferred electrode section for biasing the transferred electrode section toward the positive electrode section forming the arc, means for joining the adjacent ends of the transferred electrode section and the section forming the arc including a resin, heating means to apply heat to the resin for bonding the transferred electrode section to the electrode section forming the arc, and means directing an air stream onto an electrode section in advance of the region of application of heat to the resin for cooling the electrode section to avoid premature softening of the resin.

12. In combination, an arc lamp having a housing provided with a hollow base member, a first head mounted on the base member arranged to support a positive electrode section, a second head mounted on said base member arranged to support a negative electrode, feed roll means for said positive electrode carried by the first head, feed roll means carried by the second head for advancing the negative electrode, motive means for driving the feed roll means for the positive electrode, a second motive means for driving the negative electrode feed rolls, a third motive means, means arranged to be driven by said third motive means for rapidly advancing the negative electrode into engagement with the positive electrode to form the arc, a magazine supported by the base member and adapted to contain a supply of positive electrode sections, a support mounted on the base member, a shaft journally mounted by the support, a fourth motive means mounted by the support arranged to rotate the shaft, an electrode section transfer arm mounted upon the shaft, an electromagnetic clutch associated with said shaft adapted to effect driving connection between the transfer arm and the shaft whereby said transfer arm is adapted for rotational movement with the shaft when the electromagnetic clutch is energized, rotatable means adjacent the magazine for selectively removing an electrode section from the magazine and transferring the selected electrode to the electrode transfer arm, motive means for rotating said electrode section selecting means, said electromagnetic clutch arranged to effect rotational movement of the transfer arm upon rotational movement of the shaft to transfer the selected electrode section to a position adjacent the positive electrode section forming the arc, said transfer arm being movable lengthwise of the shaft upon rotation of the fourth motive means, resiliently supported abutment means carried by the transfer arm engageable with the transferred electrode section for moving the transferred section toward the positive electrode section forming the arc, each of said electrode sections having a quantity of resin adjacent one end whereby the resin is engaged between adjacent end regions of a transferred electrode section and the electrode section forming the arc, electrically energizable heating means adapted to apply heat to the resin for bonding the transferred electrode section to the electrode section forming the arc, and blower means for directing an air stream onto a transferred electrode section adjacent the region of application of heat to the resin to cool the electrode section to avoid premature softening of the resin.

13. An electrode transfer mechanism for an arc lamp comprising, in combination, a support, a magazine mounted by the support adapted to contain a supply of electrode sections, a rotatable electrode selector adjacent the magazine, a relatively movable electrode transfer member adapted to receive an electrode section from the selector, said transfer member being arranged to transfer the selected electrode section from the selector to a position in alignment with a partially consumed electrode section forming the arc, motive means for rotating the selector, motive means for actuating said transfer member, means for moving the transferred electrode section in a direction toward the partially consumed electrode, and means for joining an end of the transferred electrode section with the partially consumed electrode section forming the arc for continuously maintaining the arc without interruption.

14. An electrode transfer mechanism for an arc lamp comprising, in combination, a support, a magazine mounted by the support adapted to contain a supply of electrode sections, a relatively movable electrode selecting means associated with the magazine, a relatively movable electrode transfer member adapted to receive an electrode section from the electrode selector means, said transfer member being arranged to transfer an electrode section from the selector to a position in alignment with a partially consumed electrode section forming an arc, motive means for actuating the transfer member, means for exerting pressure on the transferred electrode section in a direction toward the partially consumed electrode forming the arc, a heat-softenable bonding material disposed adjacent an end of an electrode section, an oven for conditioning the material to join an end of the transferred electrode section with the partially consumed electrode section whereby to maintain a continuous electrode arrangement for maintaining the arc without interruption, cooling means effective adjacent the oven to avoid premature heat conditioning of the bonding material, and means dependent upon the amount of unconsumed electrode section for initiating operation of the electrode selector means and the electrode transferring member.

15. A method of simulating solar energy including the steps of establishing an electric arc between positive and negative electrodes, collecting radiant energy from the arc by a collecting surface, projecting the collected radiant energy through a lenticular lens to concentrate the energy into a reimaged area with substantially uniform distribution of energy in the area, masking portions of the lenticular lens to vary the intensity of energy projected to the reimaged area, and automatically feeding the positive and negative electrode at rates maintaining the arc substantially constant and at the focal point of the energy collecting surface.

16. An electrode transfer mechanism for an arc lamp comprising, in combination, a support, a magazine mounted by the support adapted to contain a supply of electrode sections, each of said electrode sections having a tenon portion of reduced diameter formed at one end, recesses associated with one end of said magazine of a width less than the normal diameter of an electrode to accommodate the tenon portions of the said electrodes but obstruct entrance of the normal diameter of an electrode section whereby the electrodes are positioned in the magazine with the tenons adjacent said one end of the magazine, means for successively delivering the electrode sections from the magazine to a position in alignment with a partially consumed electrode section forming the arc, and means for joining the delivered electrode section to the partially consumed electrode section.

References Cited
UNITED STATES PATENTS

| | | | |
|---|---|---|---|
| 363,611 | 5/1887 | Denison | 314—5 |
| 1,062,907 | 5/1913 | Guay | 314—5 |
| 1,313,666 | 8/1919 | Beck | 314—65 X |
| 1,550,320 | 8/1925 | Isbills. | |
| 2,120,243 | 6/1938 | Droll. | |
| 2,186,123 | 1/1940 | Rantsch et al. | |
| 2,356,802 | 8/1944 | Tuttle | 314—5 |
| 2,531,181 | 11/1950 | Wilson | 314—5 |
| 2,732,515 | 1/1956 | Millie et al. | 314—5 X |
| 2,786,958 | 3/1957 | Frey | 314—5 X |

JOSEPH V. TRUHE, *Primary Examiner.*